United States Patent [19]
Cox et al.

[11] Patent Number: 5,588,558
[45] Date of Patent: Dec. 31, 1996

[54] LIQUID BEVERAGE DISPENSER

[75] Inventors: Vance Cox; Barbara Cox, both of Trenton, Mo.

[73] Assignee: Van-Bar Enterprises, Inc., Trenton, Mo.

[21] Appl. No.: 405,847

[22] Filed: Mar. 17, 1995

[51] Int. Cl.$^6$ ........................................................ B67D 5/08
[52] U.S. Cl. .......................... 222/64; 222/146.6; 222/240
[58] Field of Search ............................ 222/64, 146.6, 222/235, 240; 62/177

[56] References Cited

U.S. PATENT DOCUMENTS

| | | | |
|---|---|---|---|
| 3,638,392 | 2/1972 | Welker, Jr. et al. | 222/64 X |
| 3,804,297 | 4/1974 | Jurjans | 222/64 X |
| 3,995,167 | 11/1976 | Kulig | 222/65 X |
| 4,513,892 | 4/1985 | Koeneman et al. | 222/235 |
| 4,728,005 | 3/1988 | Jacobs et al. | 222/64 |
| 4,867,350 | 9/1989 | Zelickson | 222/235 |
| 4,878,760 | 11/1989 | Newton et al. | 222/235 X |
| 4,958,747 | 9/1990 | Sheets | 222/146.6 X |
| 5,353,958 | 10/1994 | Hawkins | 222/146.6 X |
| 5,409,135 | 4/1995 | Bonomelli | 222/235 X |
| 5,425,624 | 6/1995 | Williams | 222/64 X |

*Primary Examiner*—Joseph Kaufman
*Attorney, Agent, or Firm*—Hovey, Williams, Timmons & Collins

[57] ABSTRACT

A liquid beverage dispenser for displaying and dispensing beverages is provided. The liquid beverage dispenser includes a dispensing chamber for holding and dispensing a liquid beverage, a liquid storage chamber for storing additional amounts of the liquid beverage, a pump for transferring the liquid beverage from the storage chamber to the dispensing chamber, and a liquid level sensor for measuring the liquid level in the dispensing chamber and for activating the pump for pumping liquid beverage to the dispensing chamber when the liquid level drops below a pre-determined level. The liquid level sensor is an optical sensor including a fiberoptic emitter, a fiberoptic sensor, and a fiberoptic controller.

8 Claims, 2 Drawing Sheets

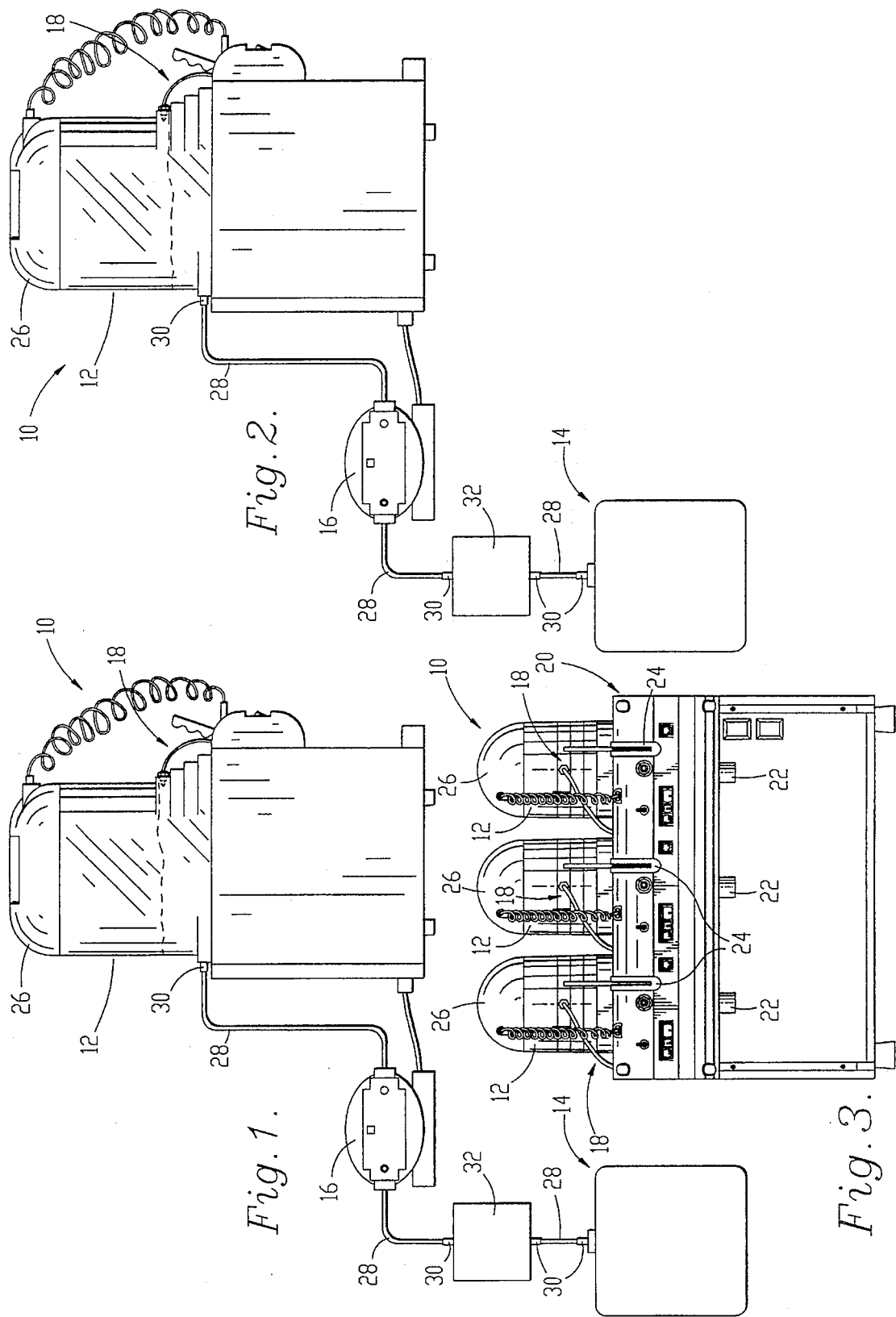

LIQUID BEVERAGE DISPENSER

BACKGROUND OF THE INVENTION

1. Field of the Invention

The present invention relates to liquid dispensers and tanks for holding and dispensing liquids, and more particularly to a liquid beverage dispenser including a liquid dispensing chamber, a liquid storage chamber, a pump for pumping liquid beverage from the storage chamber to the dispensing chamber when the liquid level in the dispensing chamber is low, and a liquid level sensor for measuring the liquid level in the dispensing chamber and for activating the pump when the liquid level is low.

2. Description of the Prior Art

Liquid beverage dispensers are commonly used by restaurants and other retail outlets for displaying and dispensing liquid beverages such as frozen ice drinks and slush drinks. These liquid beverage dispensers typically include a transparent liquid dispensing chamber positioned in the customers' view for holding and dispensing a supply of liquid beverage. To maintain a sufficient source of beverage for sale, the dispensing chamber must be monitored and refilled when the liquid level drops too low. Liquid level sensors are often provided in these dispensing chambers for measuring the liquid level and for prompting the filling of the chamber when the liquid level is low.

Prior art liquid beverage dispensers typically include a pair of electroprobes for measuring the liquid level in the dispensing chamber. The electroprobes extend from the top of the dispensing chamber into the liquid contained in the chamber. The liquid in the liquid dispensing chamber acts as a conductor for closing an electrical circuit between the electroprobes. When the liquid level drops below the electroprobes, the circuit is broken, thus the electroprobes sense that the liquid level in the dispensing chamber is low.

These electroprobe sensing devices suffer from several limitations that limit their utility. For example, the electroprobes often give false level measurement readings. Whenever there is liquid between the electroprobes, the electrical circuit between the probes is closed. This causes problems because dispensing chambers are commonly used for storing and dispensing frozen liquids. Often the liquid beverage becomes frozen and adhered between the probes. This causes the electrical circuit to remain closed even after the unfrozen liquid drops below the level of the electroprobes.

Another limitation of prior art beverage dispensers is that the electroprobes must be mounted below specially designed hoods. Additionally, since the electroprobes extend from the top of the dispenser, the dispenser must be filled from the bottom to prevent false level readings.

Another limitation of electroprobes is that they are unsightly. Most liquid beverage dispensers include a transparent dispensing chamber that places the liquid beverage in open view for enticing consumers to buy the product. To effectively measure the level of the liquid dispensing chambers, the electroprobes must extend from the top of the chamber into the liquid. Thus, the electroprobes are in constant view and detract from the enticing look of the transparent dispensing chambers.

A further limitation of electroprobes is that they are costly. Electroprobes measuring devices include a pair of large steel electroprobes and associated circuitry for measuring conductivity between the probes. These electroprobes increase the overall cost of the liquid beverage dispensers.

Another limitation of prior art liquid beverage dispensers is that many do not have means for automatically refilling the dispensing chamber when the liquid level therein drops below a predetermined level.

Accordingly, there is a need for an improved liquid beverage dispenser that overcomes the limitations of the prior art.

OBJECTS AND SUMMARY OF THE INVENTION

In view of the limitations discussed above, it is an object of the present invention to provide an improved liquid beverage dispenser including a level sensor that effectively measures the liquid level in the dispensing chamber.

It is another object of the present invention to provide a liquid beverage dispenser including means for automatically refilling the dispensing chamber when the liquid level therein drops below a predetermined level.

It is another object of the present invention to provide a liquid beverage dispenser including a liquid level sensor that accurately activates the refilling means for refilling the dispensing chamber when the liquid level therein drops below a predetermined level.

It is another object of the present invention to provide a liquid level sensor that is inexpensive to construct.

It is another object of the present invention to provide a liquid level sensor that does not detract from the look of the dispensing chamber.

In accordance with these and other objects evident from the following description of the preferred embodiment of the invention, an improved liquid beverage dispenser is provided. The preferred liquid beverage dispenser broadly includes a dispensing chamber for holding and dispensing a liquid beverage, a liquid storage chamber for storing additional amounts of the liquid beverage, a pump apparatus for transferring the liquid beverage from the storage chamber to the dispensing chamber, and a liquid level sensor for measuring the liquid level in the dispensing chamber. The liquid level sensor is also operable for activating the pump for pumping liquid beverage to the dispensing chamber when the liquid level drops below a pre-determined level.

The liquid level sensor is preferably an optical sensor including a fiberoptic emitter, a fiberoptic sensor, and a fiberoptic controller. The fiberoptic emitter is mounted in the dispensing chamber at a pre-determined level and is operable for emitting light therein. When the liquid level in the dispensing chamber is below the level of the fiberoptic emitter, the light is unimpeded. However, when the liquid level in the dispensing chamber rises above the level of the fiberoptic emitter, the light is refracted by the liquid beverage in the dispensing chamber.

The fiberoptic sensor is coupled with the fiberoptic emitter and includes means for sensing the emitted light for determining when the liquid level in the dispensing chamber drops below the level of the fiberoptic emitter. The sensor measures the light emitted by the fiberoptic emitter and senses whether the light is unimpeded or refracted by the liquid in the dispensing chamber. When the fiberoptic sensor senses that the light is unimpeded, it determines that the liquid level is low.

The fiberoptic controller is coupled with and responsive to the fiberoptic sensor. The fiberoptic controller includes means for activating the pump to transfer liquid from the storage chamber to the dispensing chamber when the fiberoptic sensor senses that the liquid level in the dispensing chamber drop below the predetermined level.

By providing the above described construction, numerous advantages are obtained. For example, by providing a liquid beverage dispenser including a dispensing chamber, a storage chamber, and a pump for transferring liquid beverage from the storage chamber to the dispensing chamber, the dispensing chamber is never emptied and thus a greater volume of liquid beverage is on display for sale.

Additionally, by providing a liquid beverage dispenser including an optical sensor level measuring device rather than electroprobes, the liquid level in the dispensing chamber can be accurately measured. This also provides an accurate signal for activating the pump for maintaining the liquid level in the dispensing chamber at a desired level. Moreover, the optical sensor is relatively inexpensive and does not detract from the enticing appearance of the liquid beverage dispenser.

BRIEF DESCRIPTION OF THE DRAWING FIGURES

A preferred embodiment of the present invention is described in detail below with reference to the attached drawing figures, wherein:

FIG. 1 is a side elevational view of a liquid beverage dispenser constructed in accordance with the preferred embodiment;

FIG. 2 is a side elevational view of the liquid beverage dispenser illustrating a low liquid beverage level;

FIG. 3 is a front view of the liquid beverage dispenser; and

DETAILED DESCRIPTION OF THE PREFERRED EMBODIMENTS

Figure 4:
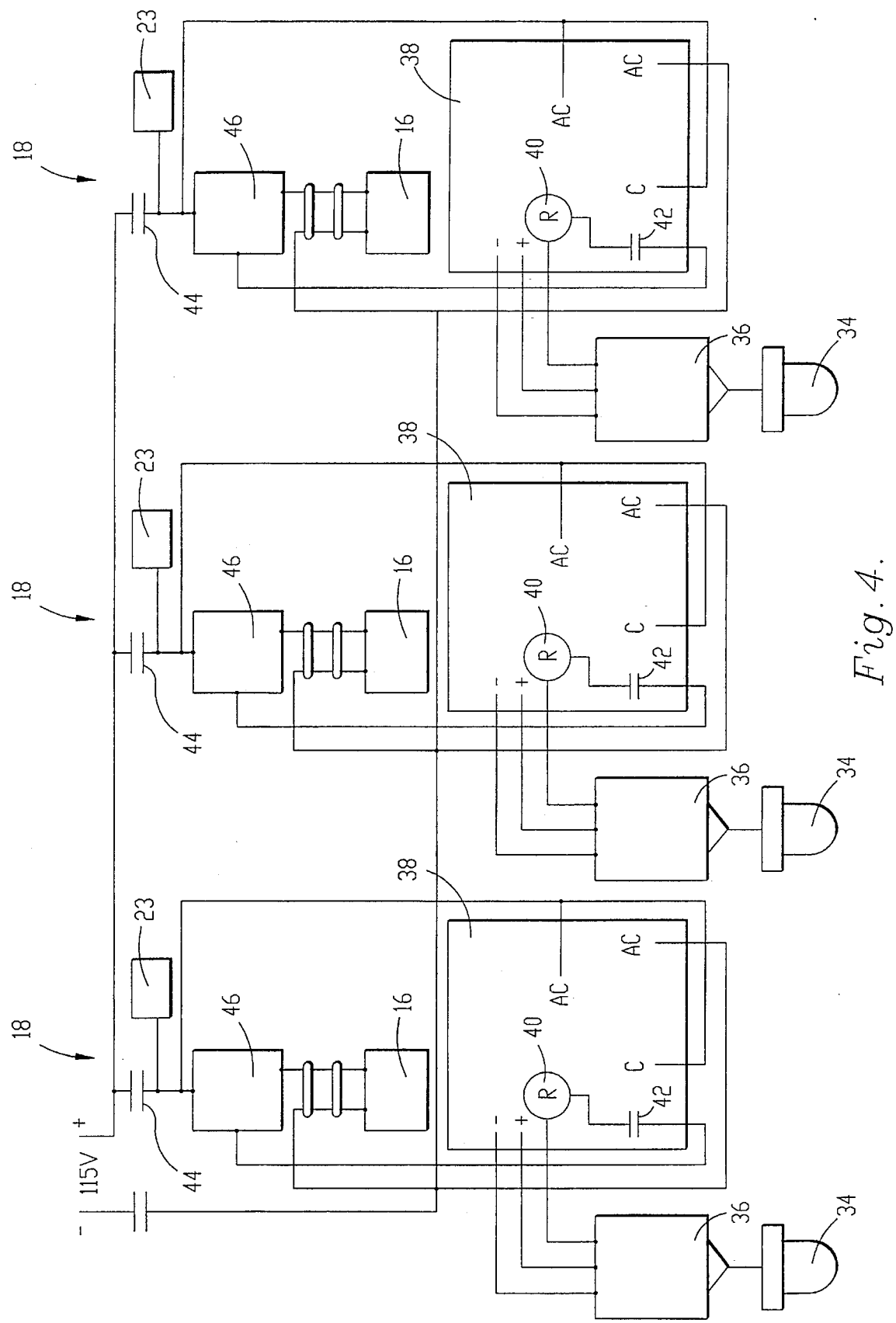
FIG. 4 is a schematic diagram illustrating the components of the liquid level sensor.

Turning now to the drawings, FIG. 1 illustrates a liquid beverage dispenser 10 constructed in accordance with the preferred embodiment of the present invention. The liquid beverage dispenser 10 is used for displaying and dispensing liquid beverage such as frozen ice drinks and slush drinks and broadly includes a dispensing chamber 12, a storage chamber 14, a pump 16 for transferring liquid from the storage chamber 14 to the dispensing chamber 12, and a liquid level sensor 18 for measuring the level of the liquid in the dispensing chamber 12. As illustrated in FIG. 3, the preferred liquid beverage dispenser 10 is mounted on a dispensing cabinet 20 along with two identical liquid beverage dispensers to form a multi-unit dispenser. Those skilled in the art will appreciate that any number of dispensing units may be provided.

In more detail, the dispensing chamber 12 is a transparent, hollow liquid-containing chamber operable for holding, displaying, and dispensing a supply of liquid beverage. The dispensing chamber 12 is preferably in the shape of an elongated dome and is formed of transparent synthetic resin material. The dispensing chamber preferably has a liquid volume of approximately 2–5 gallons.

As best illustrated in FIG. 3, the dispensing chamber 12 is coupled with a nozzle 22 and a lever-actuated valve 24 or other mechanism operable for dispensing liquid beverage from the dispensing chamber 12. The dispensing chamber 12 includes a screw-type auger 23 or other similar mixing element for stirring and mixing the liquid beverage so that it doesn't become frozen in the bottom of the chamber and clog the nozzle and valve. An opaque hood 26 and light are positioned at the top of the dispensing chamber 12 for illuminating the chamber.

The storage chamber 14 is a hollow liquid-containing chamber operable for storing an additional supply of the liquid beverage. The storage chamber 14 may be located in a walk-in cooler, under-the-counter cooler, or other storage area proximate to or remote from the dispensing chamber 12. Those skilled in the art will appreciate that the storage chamber 14 may be sized for storing any volume of liquid beverage therein.

The pump 16 is provided for transferring the liquid beverage from the storage chamber 14 to the dispensing chamber 12. The pump 16 is conventional and may be sized for any desired flow volume. The pump 16 is coupled between the storage chamber 14 and the dispensing chamber 12 by a fluid coupling hose 28. A plurality of quick disconnect couplers 30 connect the fluid coupling hose 28 to the storage chamber 14 and the dispensing chamber 12. A flash cooler 32 may also be provided between the storage container 14 and the pump 16 for quickly cooling the liquid transferred to the dispensing chamber 12.

The liquid level measuring sensor 18 measures the liquid level in the dispensing chamber 12 and activates the pump 16 to refill the dispensing chamber 12 when the level drops below a predetermined level. The preferred liquid level measuring sensor 18 is illustrated in FIG. 4 and includes a fiberoptic emitter 34, a fiberoptic sensor 36, and a fiberoptic controller 38. As illustrated, a level sensor 18 is provided for each beverage dispenser unit.

The fiberoptic emitter 34 is preferably a Series FLS-3, FLS-7 or FLS-300 emitter manufactured by GEMS. The emitter 34 is mounted in the dispensing chamber 12 at a pre-determined level and is operable for emitting a small ray or beam of light therein. The interaction of the light and the liquid contained in the dispensing chamber 12 is used for measuring the level of the liquid in the dispensing chamber 12. More particularly, when the liquid level in the dispensing chamber 12 is below the level of the fiberoptic emitter 34, the light is unimpeded. However, when the liquid level in the dispensing chamber 12 rises above the level of the fiberoptic emitter 34, the light is refracted. Thus, the emitter 34 senses that the dispensing chamber requires filling when the light is unimpeded.

The fiberoptic sensor 36 is preferably a Model Number E3XR-CE4 or CC4 optical sensor manufactured by OMRON. The fiberoptic sensor 36 is coupled with the fiberoptic emitter 34 and is operable for sensing the light from the emitter 34 for determining when the liquid level in the dispensing chamber drops below the level of the fiberoptic emitter 34. The fiberoptic sensor 36 senses whether the light is unimpeded or refracted by the liquid in the dispensing chamber. When the fiberoptic sensor 36 senses that the light is unimpeded, it determines that the liquid level is low and generates an output signal for delivery to the fiberoptic controller 38 as described below.

The fiberoptic controller 38 is preferably an OPTO-PAK controller manufactured by GEMS. The fiberoptic controller 38 is coupled with the fiberoptic sensor 36 and is operable for receiving the output signal from the fiberoptic sensor 36 and for controlling the operation of the pump 16. The fiberoptic controller 38 includes a control relay 40 having a normally open contact 42 coupled with the pump 16. When the fiberoptic controller 38 receives an output signal from the fiberoptic sensor 36, the relay 40 closes the contact 42 to activate the pump 16. This causes the pump 16 to transfer liquid from the storage chamber 14 to the dispensing chamber 12.

As illustrated in FIG. 4, the beverage dispenser 10 also includes a grind switch 44 for activating the above-described auger and a toggle switch 46 for enabling the pump 16. Those skilled in the art will appreciate that the beverage dispenser 10 may include additional control devices.

In operation, the above-described beverage dispenser 10 displays and dispenses liquid beverage such as frozen ice drinks and slush drinks. The dispensing chamber 12 is initially filled with liquid beverage from the storage chamber 14 or other supply source. The liquid level sensor 18 continually monitors the liquid level in the dispensing chamber 12 and activates the pump 16 whenever the liquid level drops below a predetermined level.

Although the invention has been described with reference to the preferred embodiment illustrated in the attached drawing figures, it is noted that equivalents may be employed and substitutions made herein without departing from the scope of the invention as recited in the claims. For example, although the liquid level measuring sensor 18 is preferably used in conjunction with a beverage dispenser, it may be used to measure the level of other liquid containers such as gas tanks.

Having thus described the preferred embodiment of the invention, what is claimed as new and desired to be protected by Letters Patent includes the following:

1. A liquid dispenser comprising:
   a transparent liquid dispensing chamber positioned atop a cabinet for holding and dispensing a liquid therefrom while permitting customers to view the liquid contained therein;
   means for dispensing the liquid from said dispensing chamber;
   an auger positioned within said dispensing chamber for stirring the liquid contained in said liquid dispensing chamber;
   a switch for activating said auger;
   a liquid storage chamber for storing additional amounts of the liquid therein;
   means for transferring the liquid from said storage chamber to said dispensing chamber; and
   a liquid level sensor including measuring means for measuring the liquid level in said dispensing chamber and activating means for activating said transferring means to transfer liquid from said storage chamber to said dispensing chamber when the liquid level drops below a predetermined level, said liquid level sensor including an optical sensor.

2. The liquid dispenser as set forth in claim 1, wherein said optical sensor includes a fiberoptic emitter mounted at a predetermined level in said dispensing chamber, said fiberoptic emitter being operable for emitting a light into said liquid dispensing chamber.

3. The liquid dispenser as set forth in claim 2, wherein said optical sensor further includes a fiberoptic sensor coupled with said fiberoptic emitter, said fiberoptic sensor including means for sensing when the light emitted by said fiberoptic emitter is refracted by a liquid level higher than the predetermined level.

4. The liquid dispenser as set forth in claim 3, wherein said optical sensor further includes a fiberoptic controller coupled with said fiberoptic sensor, said activating means being operable for activating said transferring means to transfer liquid from said storage chamber to said dispensing chamber when said fiberoptic sensor senses that the liquid level in said dispensing chamber drops below a predetermined level.

5. The liquid dispenser as set forth in claim 1, wherein said transferring means includes a pump and a fluid hose coupling said pump between said dispensing chamber and said storage chamber.

6. The liquid dispenser as set forth in claim 1 further including a flash cooler coupled between said storage chamber and said dispensing chamber for quickly cooling the liquid transferred from said storage chamber to said dispensing chamber.

7. A liquid beverage dispenser comprising:
   a transparent liquid dispensing chamber positioned atop a cabinet for holding and dispensing a liquid beverage therefrom while permitting customers to view the liquid contained therein;
   means for dispensing the liquid beverage from said dispensing chamber;
   an auger positioned within said dispensing chamber for stirring the liquid contained in said liquid dispensing chamber;
   a switch for activating said auger;
   a liquid storage chamber for storing additional amounts of the liquid beverage therein;
   a fluid hose coupling said dispensing chamber with said storage chamber;
   a pump for pumping the liquid beverage through said fluid hose from said storage chamber to said dispensing chamber; and
   an optical sensor for measuring the level of the liquid in said dispensing chamber and for activating said pump to pump liquid beverage from said storage chamber to said dispensing chamber when the level drops below a predetermined level, said optical sensor including
      a fiberoptic emitter mounted at a predetermined level in said dispensing chamber operable for emitting a light into said liquid dispensing chamber,
      a fiberoptic sensor coupled with said fiberoptic emitter including means for sensing when the light emitted by said fiberoptic emitter is refracted by a liquid level higher than the predetermined level,
      a fiberoptic controller coupled with said fiberoptic sensor including means for activating said pump to pump liquid beverage from said storage chamber to said dispensing chamber when said fiberoptic sensor senses that the liquid level in said dispensing chamber drops below a predetermined level.

8. The liquid dispenser as set forth in claim 7 further including a flash cooler coupled between said storage chamber and said dispensing chamber for quickly cooling the liquid transferred from said storage chamber to said dispensing chamber.

* * * * *